(12) United States Patent
Wu et al.

(10) Patent No.: US 11,284,466 B2
(45) Date of Patent: Mar. 22, 2022

(54) PERFORMING RESUME REQUEST PROCEDURE

(71) Applicant: Lenovo (Beijing) Limited, Beijing (CN)

(72) Inventors: Lianhai Wu, Beijing (CN); Jing Han, Beijing (CN); Haiming Wang, Beijing (CN); Zhuoyun Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 77 days.

(21) Appl. No.: 16/646,840

(22) PCT Filed: Sep. 28, 2017

(86) PCT No.: PCT/CN2017/103916
§ 371 (c)(1),
(2) Date: Mar. 12, 2020

(87) PCT Pub. No.: WO2019/061135
PCT Pub. Date: Apr. 4, 2019

(65) Prior Publication Data
US 2020/0275512 A1    Aug. 27, 2020

(51) Int. Cl.
*H04W 76/20* (2018.01)
*H04W 92/20* (2009.01)

(52) U.S. Cl.
CPC ............ *H04W 76/20* (2018.02); *H04W 92/20* (2013.01)

(58) Field of Classification Search
CPC ..... H04W 76/20; H04W 92/20; H04W 48/20; H04W 76/27
See application file for complete search history.

(56) References Cited

U.S. PATENT DOCUMENTS

| 2011/0096737 A1* | 4/2011 | Venkatachalam ... H04W 12/062 370/329 |
| 2018/0092157 A1* | 3/2018 | Chen ................... H04W 52/028 |
| 2018/0220486 A1* | 8/2018 | Tseng ................ H04W 74/0833 |
| 2020/0163149 A1* | 5/2020 | Mildh ................... H04W 76/27 |

(Continued)

FOREIGN PATENT DOCUMENTS

| CN | 106658758 A | 5/2017 |
| CN | 107211468 A | 9/2017 |

(Continued)

OTHER PUBLICATIONS

PCT/CN2017/103916, "International Search Report and the Written Opinion of the International Searching Authority/CN", International Searching Authority/CN, State Intellectual Property Office of the P.R. China, dated Apr. 16, 2018, pp. 1-6.

(Continued)

*Primary Examiner* — Charles C Jiang
*Assistant Examiner* — Shawn D Miller
(74) *Attorney, Agent, or Firm* — Kunzler Bean & Adamson (57) ABSTRACT

Method, base unit and remote unit are disclosed for performing a resume request procedure. A method comprising: receiving a resume request from a remote unit in an inactive state; sending a message to a last serving base unit; and in response to receiving a response from the last serving base unit, sending a configuration message to the remote unit to maintain the remote unit in the inactive state.

20 Claims, 5 Drawing Sheets

(56) References Cited

U.S. PATENT DOCUMENTS

2020/0214070 A1* 7/2020 Ingale ............... H04W 74/0833

FOREIGN PATENT DOCUMENTS

| WO | 2017085621 A1 | 5/2017 |
| WO | 2017122588 A1 | 7/2017 |

OTHER PUBLICATIONS

Ericsson, "RAN Area update in RRC_INACTIVE", R2-1707843 (Revision of R2-1707299), 3GPP TSG-RAN WG2 #99, Aug. 21-25, 2017, pp. 1-8.
LG Electronics Inc, "Remaining FFS about RAN area update procedure", 3GPP TSG-RAN2 AH Meeting R2-1707143, Jun. 27-29, 2017, pp. 1-3.
CATT, "Periodic RNA update", 3GPP TSG-RAN WG3 #97 R3-172791, Aug. 21-25, 2017, pp. 1-3.
Huawei, "RAN-based notification area update", 3GPP TSG-RAN WG3 #97 R3-173083, Aug. 21-25, 2017, pp. 1-2.
Ericsson, "RAN area updating due to mobility in RRC_INACTIVE", 3GPP TSG-RAN WG2 #97 Tdoc R2-1700894, Feb. 13-17, 2017, pp. 1-4.
Ericsson, "Periodic RAN area updates in RRC_INACTIVE", 3GPP TSG-RAN WG2 #97 Tdoc R2-1700895, Feb. 13-17, 2017, pp. 1-5.
European Patent Office, "Extended European Search Report", dated Mar. 15, 2021, pp. 1-14.

* cited by examiner

PERFORMING RESUME REQUEST PROCEDURE

FIELD

The subject matter disclosed herein relates generally to wireless communications and more particularly relates to performing a resume request procedure.

BACKGROUND

The following abbreviations are herewith defined, at least some of which are referred to within the following description: Third Generation Partnership Project ("3GPP"), UE (User Entity/Equipment (Mobile Terminal)), AS (Access Stratum), RRC (Radio Resource Control), RAN (Radio Access Network), DL (downlink), UL (uplink), gNB (Next Generation Node B or 5G Node Base), RNAU (RAN notification area update), AMF (Core Access and Mobility Management Function), UPF (User plane Function), NR (New Radio), CN (Core Network), SRB (signaling radio bearer), Xn-AP (Xn-Access Point, in which Xn is an interface), Evolved Node B ("eNB"), and Long Term Evolution ("LTE").

In the New Radio (NR) system, a remote unit can be configured into a RRC_INACTIVE state by a gNB. The RRC_INACTIVE state is a new RRC (Radio Resource Control) state in NR. The following behaviors/procedures related to the remote unit in a RRC_INACTIVE state are allowed: cell re-selection mobility; CN (Core Network)—NR-RAN connection (both C/U-planes) has been established for a remote unit; the remote unit AS (Access Stratum) context is stored in at least one of the base unit and the remote unit; paging is initiated by NR-RAN; RAN-based notification area is managed by NR-RAN; NR-RAN knows the RAN-based notification area which the remote unit belongs to.

In particular, the RRC_INACTIVE state is a state where a remote unit remains connected with the core network and can move within an area configured by NG-RAN without notifying NG-RAN. In the RRC_INACTIVE state, the last serving NG-RAN node keeps the remote unit context and NG connection with the serving AMF and UPF. The remote unit notifies the network if it moves out of the configured RNA. The remote unit in the RRC_INACTIVE state can be configured with the NG-RAN, where the NG-RAN can cover a single or multiple cells, and can be smaller than CN (Core Network) area; and a RAN notification area update (RNAU) is periodically sent by the remote unit and is also sent when the cell reselection procedure of the remote unit selects a cell that does not belong to the configured NG-RAN. There are several different alternatives on how the RNA can be configured. A remote unit may be provided with a list of one or more cells that constitute the NG-RAN, i.e. list of cells. Alternatively, a remote unit may be provided with at least one RAN area ID, in which a RAN area is a subset of a CN Tracking Area. Alternatively, a cell broadcasts at least one RAN area ID in the system information so that a remote unit knows which area the cell belongs to.

Figure 1:
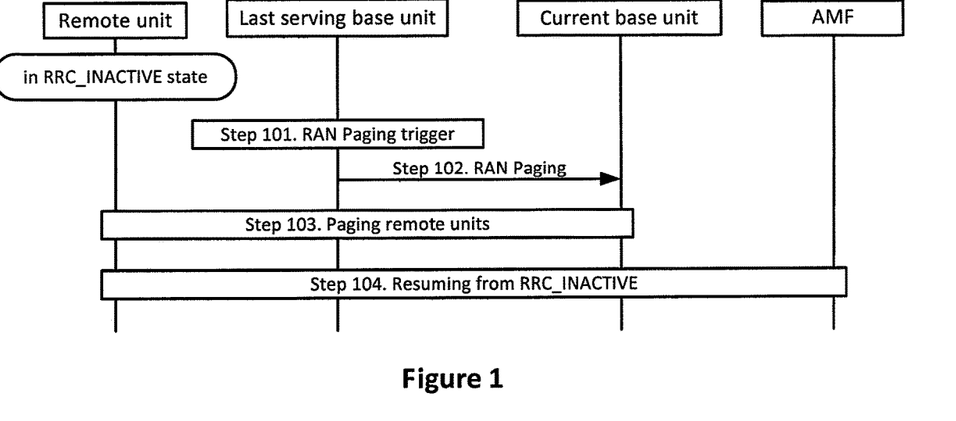
FIG. 1 is a schematic diagram illustrating a network triggered transition of a remote unit from RRC_INACTIVE state to RRC_CONNECTED state.

If the last serving base unit receives DL data from the UPF or DL signaling from the AMF while the remote unit is in the RRC_INACTIVE state, it pages in the cells corresponding to the RNA and may send Xn-AP RAN Paging to neighboring base units if the RNA includes cells of neighboring base units. Steps 101-104 of FIG. 1 show a network triggered transition from RRC_INACTIVE state to RRC_CONNECTED state.

Figure 2:
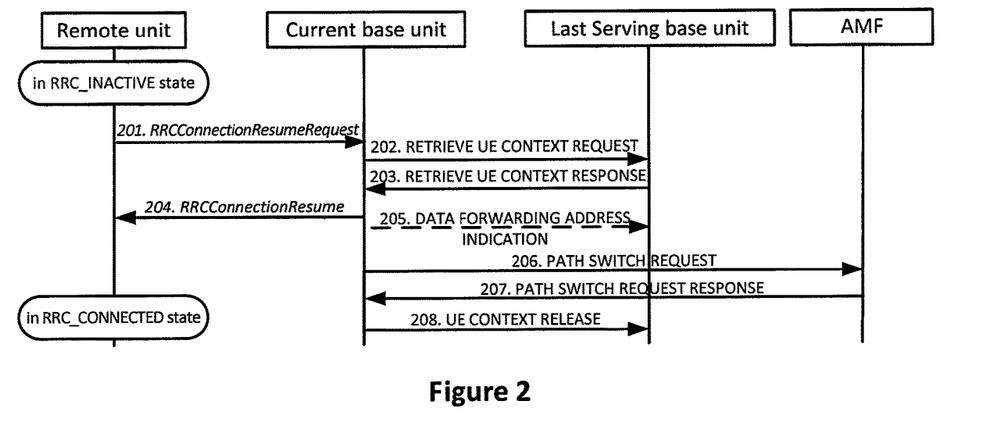
FIG. 2 is a schematic diagram illustrating a resume request procedure in which the remote unit changes from RRC_INACTIVE state to RRC_CONNECTED state.

If the remote unit accesses a base unit (current base unit) other than the last serving base unit, the receiving base unit triggers the Xn-AP Retrieve UE Context procedure to get the remote unit context from the last serving base unit and may also trigger a Data Forwarding procedure including tunnel information for potential recovery of data from the last serving base unit. Upon successful context retrieval, the receiving base unit becomes the serving base unit and further triggers the NG-AP Path Switch Request procedure. After the path switch procedure, the serving base unit triggers release of the UE context at the last serving base unit by means of the Xn-AP UE Context Release procedure. Steps 201-208 of FIG. 2 show the resume request procedure as described above.

After the completion of the above procedure, the current base unit will become the serving base unit, and therefore, if the above procedure is performed again, the current base unit will become the last serving base unit. In at least the following four cases the remote unit will be triggered to perform the resume request procedure as shown in FIG. 2: (1) Periodic RAN notification area update; (2) Event-triggered RAN notification area update, such as the remote unit leaving the configured area; (3) UL data arrival; and (4) DL data arrival. In the case of a Periodic RAN notification area update, it is not necessary to perform a path switch or retrieve UE context. Specifically, a Periodic RAN notification area update is performed periodically so that the base unit knows that remote unit operates appropriately in the RRC_INACTIVE state. In this case, there is no need for the current base unit to retrieve the UE context request from the last serving base unit, and there is no need for the current base unit to become the last serving base unit.

BRIEF SUMMARY

Apparatuses and methods for performing a resume request procedure are disclosed. In one embodiment, a method comprising: receiving a resume request from a remote unit in an inactive state; sending a message to a last serving base unit; and in response to receiving a response from the last serving base unit, sending a configuration message to the remote unit to maintain the remote unit in the inactive state.

In one embodiment, the resume request includes a cause of the resume request. The cause is preferably periodic RAN notification area update. In a further embodiment, the message includes a resume ID or a UE ID. The last serving base unit preferably continues storing a UE context of the remote unit. In certain embodiments, the method sends an indicator to the last serving base unit and in response to receiving an acknowledge response from the last serving base unit, sends the configuration message to the remote unit. In such embodiments, the configuration message may be sent by SRB0 in plain text. In certain embodiments, the method sends a Retrieve UE Context Request to the last serving base unit, and in response to receiving a UE context of the remote unit from the last serving base unit, sends the configuration message to the remote unit. In such embodiments, the configuration message may be sent by SRB1 with encryption. In some embodiments, an assistant indicator is included in the Retrieve UE Context Request to instruct the last serving base unit to continue storing the UE context of the remote unit.

In one embodiment, a base unit comprises a transceiver that receives a resume request from a remote unit in an inactive state and sends a message to a last serving base unit; and in response to receiving a response from the last serving base unit, sends a configuration message to the remote unit to maintain the remote unit in the inactive state.

In one embodiment, a remote unit which is in an inactive state comprises a transceiver that sends a resume request to a base unit; and receives a configuration message from the base unit to maintain the remote unit in the inactive state, wherein the base unit sends a message to a last serving base unit and sends the configuration message in response to receiving a response from the last serving base unit. Preferable, the resume request includes a cause of the resume request. More preferable, the cause is periodic RAN notification area update.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit" "module" or "system". Furthermore, embodiments may take the form of a program product embodied in one or more computer-readable storage devices storing machine readable code, computer-readable code, and/or program code, referred hereafter to as code. The storage devices may be tangible, non-transitory, and/or non-transmission. The storage devices may not embody signals. In a certain embodiment, the storage devices only employ signals for accessing code.

Certain functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), erasable programmable read-only memory ("EPROM" or flash memory), a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment" or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having" and variations thereof mean "including but not limited to" unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, executed via the processor of the computer or other programmable data processing apparatus, create a means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may in fact be substantially executed in concurrence, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood as not limiting the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 3:
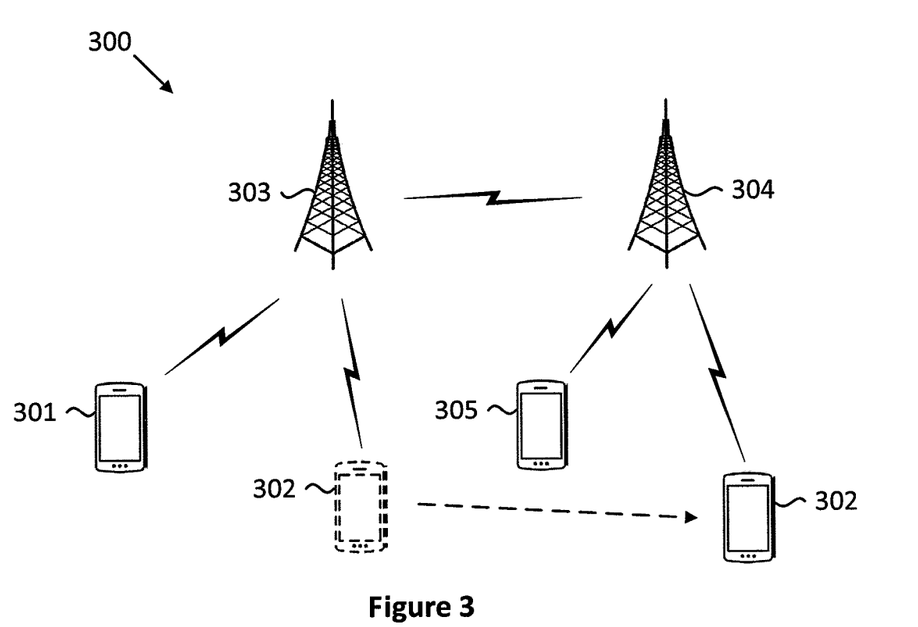
FIG. 3 is a schematic block diagram illustrating one embodiment of a wireless communication system for performing a resume request procedure.

FIG. 3 depicts an embodiment of a wireless communication system 300 for performing a resume request procedure. In one embodiment, the wireless communication system 300 includes remote units 301, 302, 305 and base units 303, 304. Even though a specific number of remote units and base units are depicted in FIG. 1, one skilled in the art will recognize that any number of remote units and base units may be included in the wireless communication system 300.

In one embodiment, the remote units may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units include wearable devices, such as smart watches, fitness bands, optical head-mounted displays, or the like. Moreover, the remote units may be referred to as subscriber units, mobiles, mobile stations, users, terminals, mobile terminals, fixed terminals, subscriber stations, UE, user terminals, a device, or by other terminology used in the art.

The base units may be distributed over a geographic region. In certain embodiments, a base unit may also be referred to as an access point, an access terminal, a base, a base station, a Node-B, an eNB, a gNB, a Home Node-B, a relay node, a device, or by any other terminology used in the art. The base units are generally part of a radio access network (RAN) that includes one or more controllers communicably coupled to one or more corresponding base units. The radio access network is generally communicably coupled to one or more core networks, which may be coupled to other networks, like the Internet or public switched telephone networks, among other networks. These and other elements of radio access and core networks are not illustrated but are well known generally by those having ordinary skill in the art.

The base units may serve a number of remote units within a serving area, for example, a cell or a cell sector via a wireless communication link. Any of the remote units can move from a serving area of one base unit to a serving area of another base unit. FIG. 1 shows that that the base unit 303 serves the remote units 310 and 302, while the base unit 304 serves the remote units 305 and 302. The remote unit 302 moves from the serving area of the base unit 303 to the serving area of the base unit 304. In some embodiments, the base unit 303, which previously served the remote unit 302, may be referred to as the last serving base unit or the anchor base unit.

Figure 4:
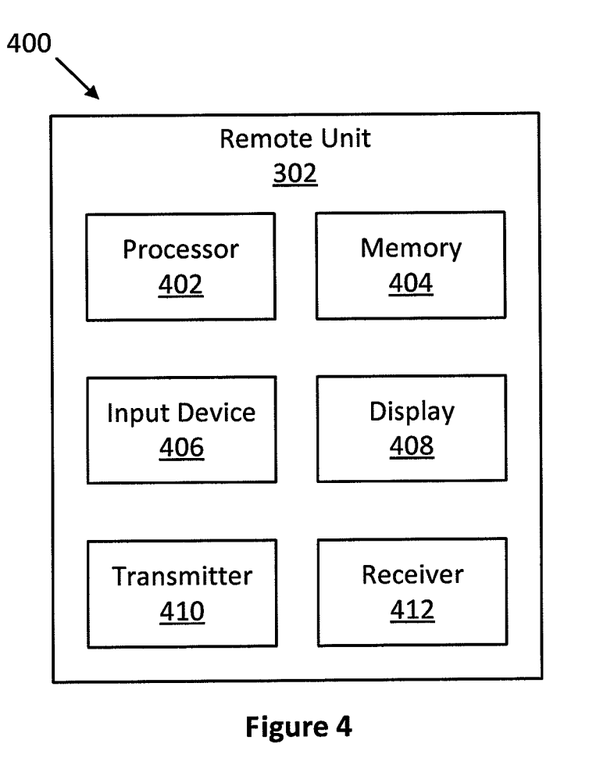
FIG. 4 is a schematic block diagram illustrating one embodiment of an apparatus that may be used for performing a resume request procedure.

FIG. 4 depicts one embodiment of an apparatus 400 that may be used for performing a resume request procedure. The apparatus 400 includes one embodiment of the remote unit 302. Furthermore, the remote unit 302 may include a processor 402, a memory 404, an input device 406, a display 408, a transmitter 410, and a receiver 412. In some embodiments, the input device 406 and the display 408 are combined into a single device, such as a touch screen. In certain embodiments, the remote unit 302 may not include any input device 406 and/or display 408. In various embodiments, the remote unit 302 may include one or more of the processor 402, the memory 404, the transmitter 410, and the receiver 412, and may not include the input device 406 and/or the display 408.

The processor 402, in one embodiment, may include any known controller capable of executing computer-readable instructions and/or capable of performing logical operations. For example, the processor 402 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 402 executes instructions stored in the memory 404 to perform the methods and routines described herein. In various embodiments, the processor 402 may determine that a resume request procedure should be initiated. For example, the base unit would initiate a resume procedure in at least the following four cases: (1) Periodic RAN notification area update; (2) Even-triggered RAN notification area update, such as leaving the configured area; (3) UL data arrival; and (4) DL data arrival. The processor 402 is communicatively coupled to the memory 404, the input device 406, the display 408, the transmitter 410, and the receiver 412.

The memory 404, in one embodiment, is a computer-readable storage medium. In some embodiments, the memory 404 includes volatile computer storage media. For example, the memory 404 may include RAM, including dynamic RAM ("DRAM"), synchronous dynamic RAM ("SDRAM"), and/or static RAM ("SRAM"). In some embodiments, the memory 404 includes non-volatile computer storage media. For example, the memory 404 may include a hard disk drive, a flash memory, or any other suitable non-volatile computer storage device. In some embodiments, the memory 404 includes both volatile and non-volatile computer storage media. In some embodiments, the memory 404 stores data relating to random access procedures. In some embodiments, the memory 404 also stores program code and related data, such as an operating system or other controller algorithms operating on the remote unit 302.

The input device 406, in one embodiment, may include any known computer input device including a touch panel, a button, a keyboard, a stylus, a microphone, or the like. In some embodiments, the input device 406 may be integrated with the display 408, for example, as a touch screen or similar touch-sensitive display. In some embodiments, the input device 406 includes a touch screen such that text may be input using a virtual keyboard displayed on the touch screen and/or by handwriting on the touch screen. In some embodiments, the input device 406 includes two or more different devices, such as a keyboard and a touch panel.

The display 408, in one embodiment, may include any known electronically controllable display or display device. The display 408 may be designed to output visual, audible, and/or haptic signals. In some embodiments, the display 408 includes an electronic display capable of outputting visual data to a user. For example, the display 408 may include, but is not limited to, an LCD display, an LED display, an OLED display, a projector, or similar display device capable of outputting images, text, or the like to a user. As another, non-limiting, example, the display 408 may include a wearable display such as a smart watch, smart glasses, a heads-up display, or the like. Further, the display 408 may be a component of a smart phone, a personal digital assistant, a television, a table computer, a notebook (laptop) computer, a personal computer, a vehicle dashboard, or the like.

In certain embodiments, the display 408 includes one or more speakers for producing sound. For example, the display 408 may produce an audible alert or notification (e.g., a beep or chime). In some embodiments, the display 408 includes one or more haptic devices for producing vibrations, motion, or other haptic feedback. In some embodiments, all or portions of the display 408 may be integrated with the input device 406. For example, the input device 406 and display 408 may form a touch screen or similar touch-sensitive display. In other embodiments, the display 408 may be located near the input device 406.

The transmitter 410 is used to provide UL communication signals to the base unit 304 and the receiver 412 is used to receive DL communication signals from the base unit 304. Although only one transmitter 410 and one receiver 412 are illustrated, the remote unit 302 may have any suitable number of transmitters 410 and receivers 412. The transmitter 410 and the receiver 412 may be any suitable type of transmitters and receivers. In one embodiment, the transmitter 410 and the receiver 412 may be part of a transceiver.

Figure 5:
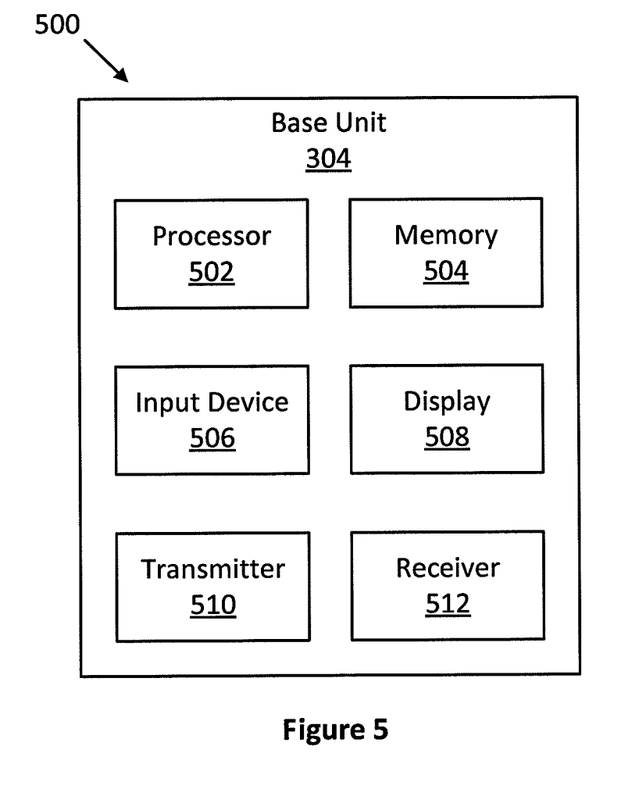
FIG. 5 is a schematic block diagram illustrating one embodiment of an apparatus that may be used for performing a resume request procedure.

FIG. 5 depicts one embodiment of an apparatus 500 that may be used for performing a resume request procedure. The apparatus 500 includes one embodiment of the base unit 304. Furthermore, the base unit 304 may include a processor 502, a memory 504, an input device 506, a display 508, a transmitter 510, and a receiver 512. As may be appreciated, the processor 502, the memory 504, the input device 506, the display 508, the transmitter 510, and the receiver 512 may be substantially similar to the processor 402, the memory 404, the input device 406, the display 408, the transmitter 410, and the receiver 412 of the remote unit 302, respectively.

In some embodiments, the receiver 512 may be used to receive resume request from the transmitter 410 of the remote unit 302. Although only one transmitter 510 and one receiver 512 are illustrated, the base unit 304 may have any suitable number of transmitters 510 and receivers 512. The transmitter 510 and the receiver 512 may be any suitable type of transmitters and receivers. In one embodiment, the transmitter 510 and the receiver 512 may be part of a transceiver.

Figure 6:
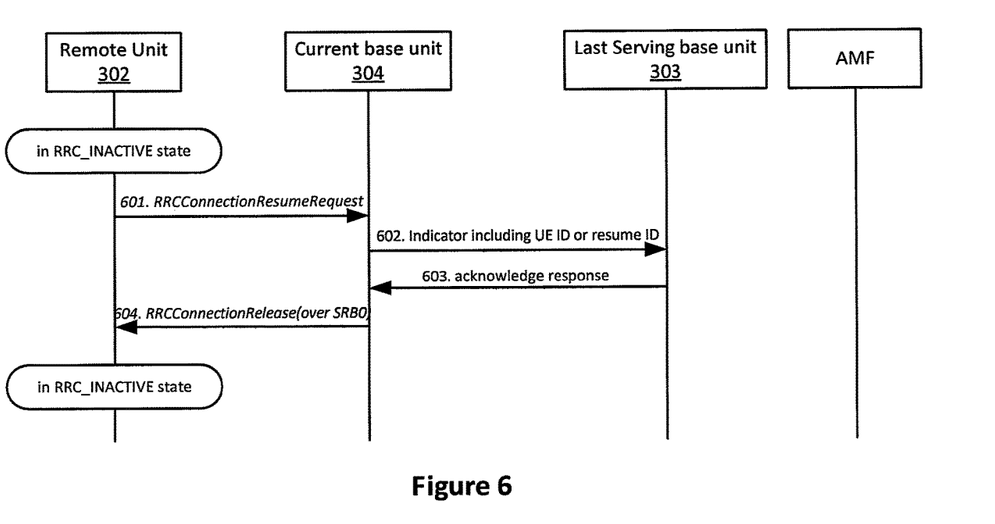
FIG. 6 is a schematic diagram illustrating one embodiment of a method for performing a resume request procedure.

FIG. 6 is a schematic diagram illustrating one embodiment of a method for performing a resume request procedure.

The remote unit 302 is in a RRC-INACTIVE state. As described above, in four cases, the remote unit would initiate a resume procedure: (1) Periodic RAN notification area update; (2) Event-triggered RAN notification area update, such as leaving configured area; (3) UL data arrival; and (4) DL data arrival. The remote unit 302 sends, for example, by the transmitter 410, a RRC Connection Resume Request message to the base unit 304 (step 601). The resume request message includes a resume ID. The resume ID was previously allocated by the last serving base unit 303. The resume ID includes at least the UE ID of the remote unit 302 and the ID of the last serving base unit 303.

Preferably, a cause is included in the resume request message. The cause informs the base unit 304 of the reason why the remote unit 302 initiates the resume request. The cause includes but not limited to the aforementioned four cases. For example, the resume request message may include a cause that a periodic RAN notification area update is performed.

Upon receiving the resume request message for example by the receiver 512, the base unit 304 sends for example by the transmitter 510 a message to the last serving base unit 303 (step 602). Preferably, the message is an indicator including at least the UE ID or the resume ID. The UE ID or the resume ID can be used by the last serving base unit 303 to determine which remote unit is performing the resume request. The last serving base unit 303 receives the indicator and sends an acknowledgement response to the base unit 304 (step 603).

Upon receiving the acknowledgement response from the last serving base unit 303 for example by the receiver 512, the base unit 304 sends for example by the transmitter 510 a RRC Connection Release response to the remote unit 302 (step 604). Unlike the RRC Connection Resume response shown in step 204 of FIG. 2 which will change the remote unit 302 to the RRC_CONNECTED state, the RRC Connection Release response will keep the remote unit 302 in the RRC-INACTIVE state. The resume ID is preferably included in the RRC Connection Release response. As described above, the resume ID includes at least the UE ID of the remote unit 302 and the ID of the last serving base unit 303. The RRC Connection Release response is sent to the remote unit 302 over SRB0. SRB0 is a signaling radio bearer that means the signal being sent in plain text without encryption. The RRC Connection Release response is just an example for keeping the remote unit 302 in the RRC-INACTIVE state. Other RRC messages may be alternatively used for the same purpose of keeping the remote unit 302 in the RRC-INACTIVE state.

After receiving the RRC Connection Release response, the remote unit 302 will stay in the inactive state.

A comparison between FIGS. 2 and 6 indicates that the remote unit 302 is in a different state. In FIG. 2, after the RRC Connection Resume Request initiated by the remote unit at step 201, the remote unit will finally change into the connected state. Furthermore, FIG. 2 implies that the current base unit will become the last serving base unit, which means a path switch. That is to say, after the remote unit initiates the RRC Connection Resume Request, the anchor base unit of the remote unit will switch from the last serving base unit to the current base unit. In addition, the remote unit will change from the inactive state to the connected state.

On the other hand, according to the embodiment of FIG. 6, the current base unit 304 sends a RRC Connection Release to the remote unit 302 to keep the remote unit 302 stay in the inactive state. Moreover, the last serving base unit 303 remains as the anchor base unit of the remote unit 302. Preferably, the resume ID including at least the UE ID of the remote unit 302 and the ID of the last serving base unit 303 is sent from the current base unit 304 to the remote unit 302. The inclusion of the ID of the last serving base unit 303 in the resume ID sent to the remote unit 302 indicates that the last serving base unit 303 remains as the last serving base unit (anchor base unit). Therefore, in the condition of for example the periodic RAN notification area update, no path switch occurs for the remote unit in the inactive state.

Figure 7:
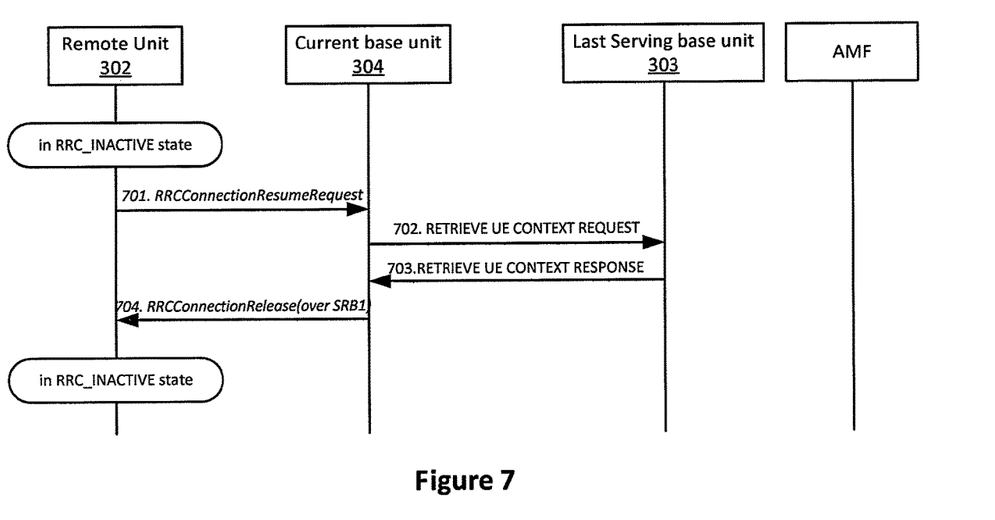
FIG. 7 is a schematic diagram illustrating another embodiment of a method for performing a resume request procedure.

FIG. 7 is a schematic diagram illustrating another embodiment of a method for performing a resume request procedure.

Step 701 is the same as step 601 of FIG. 6. The remote unit 302 in the RRC-INACTIVE state sends a RRC Connection Resume Request message to the base unit 304. The resume request message includes the resume ID and preferably the cause.

Upon receiving the resume request message, the base unit 304 sends a Retrieve UE Context Request to the last serving base unit 303 (step 702).

The last serving base unit 303, upon receiving the Retrieve UE Context Request, sends a Retrieve UE Context Response to the base unit 304 (step 703). The Response includes the UE context of the remote unit 302.

After receiving the UE context of the remote unit 302 from the last serving base unit 303, the base unit 304 sends the RRC Connection Release response to the remote unit 302 over SRB1 (step 704). SRB1 is a signaling radio bearer that means the signal being sent with encryption. The encryption is made by using the UE context of the remote unit 302. An integrity protection is also preferably made over SRB1.

After receiving the RRC Connection Release response, the remote unit 302 will stay in the inactive state.

Figure 8:
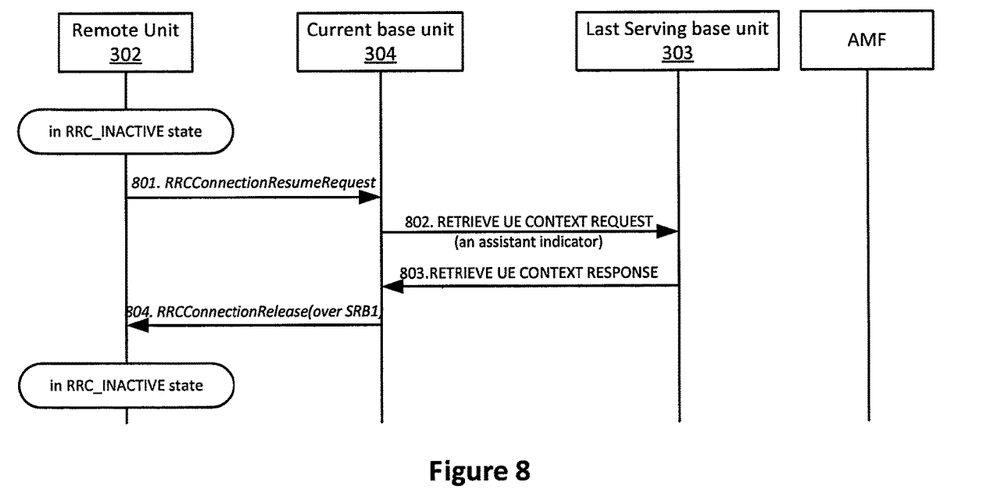
FIG. 8 is a schematic diagram illustrating yet another embodiment of a method for performing a resume request procedure.

FIG. 8 is a schematic diagram illustrating yet another embodiment of a method for performing a resume request procedure.

Steps 801, 803 and 804 are the same as steps 701, 703 and 704 of FIG. 7. The detailed description of the steps 801, 803 and 804 are herein omitted.

The embodiment of FIG. 8 differs from FIG. 7 in the step 802. In step 702, the base unit 304 sends a Retrieve UE Context Request to the last serving base unit 303. In step 802, the Retrieve UE Context Request further includes an assistant indicator. The assistant indicator instructs the last serving base unit 303 to store the UE Context of the remote unit 302.

In the embodiment of FIG. 6 and the another embodiment of FIG. 7, the last serving base unit 303 does not receive, from the base unit 304, an instruction on whether the UE context of the remote 302 should be still stored in the last serving base unit 303. In absence of an instruction for releasing or deleting the UE context, the last serving base unit 303 stores the UE context of the remote unit. The last serving base unit 303 releases or deletes the UE context of the remote unit only if it receives a UE CONTEXT RELEASE message, e.g, from the current base unit shown in step 208 of FIG. 2.

In the step 602, the last serving base unit 303 receives the indicator including the UE ID or resume ID of the remote unit 302. Therefore, the last serving base unit 303 knows that a periodic RAN notification area update is performed by the remote unit 302. Because no instruction for releasing (deleting) the UE context of the remote unit 302 is received by the last serving base unit 303, the last serving base unit 303 continues storing the UE context of the remote unit 302 and continues serving as the last serving base unit (anchor base unit) for the remote unit 302.

Similarly, in the step 702, the last serving base unit 303 receives the Retrieve UE Context Request from the base unit 304. Therefore, the last serving base unit 303 knows that a periodic RAN notification area update is performed by the remote unit 302. Because no instruction for releasing (deleting) the UE context of the remote unit 302 is received by the last serving base unit 303, the last serving base unit 303 continues storing the UE context of the remote unit 302 and continues serving as the last serving base unit (anchor base unit) for the remote unit 302.

In the step 802, the last serving base unit 303 receives the assistant indicator included in the Retrieve UE Context Request from the base unit 304. The assistant indicator instructs the last serving base unit 303 to continue storing the UE context of the remote unit 302. Therefore, the last serving base unit 303 continues storing the UE context of the remote unit 302 and continues serving as the last serving base unit (anchor base unit) for the remote unit 302.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a current base unit, the method comprising:
   receiving a resume request from a remote unit in an inactive state;
   in response to receiving the resume request, sending a message to a last serving base unit separate from the current base unit; and
   in response to receiving a response from the last serving base unit, sending a configuration message to the remote unit to maintain the remote unit in the inactive state.

2. The method of claim 1, wherein the resume request includes a cause of the resume request.

3. The method of claim 2, wherein the cause is a periodic radio access network ("RAN") notification area update.

4. The method of claim 1, wherein the message includes a resume ID or a user equipment ("UE") ID.

5. The method of claim 1, wherein the last serving base unit continues storing a user equipment ("UE") context of the remote unit.

6. The method of claim 1, further comprising:
   sending an indicator to the last serving base unit; and
   in response to receiving an acknowledge response from the last serving base unit, sending the configuration message to the remote unit.

7. The method of claim 6, wherein a resume ID or a user equipment ("UE") ID is included in the indicator.

8. The method of claim 1, wherein the configuration message is sent by a signal radio bearer.

9. The method of claim 1, further comprising:
   sending a Retrieve user equipment ("UE") Context Request to the last serving base unit; and
   in response to receiving a UE context of the remote unit from the last serving base unit, sending the configuration message to the remote unit.

10. The method of claim 9, wherein the configuration message is sent by a signal radio bearer.

11. The method of claim 9, wherein an assistant indicator is included in the Retrieve user equipment ("UE") Context Request to instruct the last serving base unit to continue storing the UE context of the remote unit.

12. A current base unit comprising:
    a transceiver that:
       receives a resume request from a remote unit in an inactive state;
       in response to receiving the resume request, sends a message to a last serving base unit separate from the current base unit; and
       in response to receiving a response from the last serving base unit, sends a configuration message to the remote unit to maintain the remote unit in the inactive state.

13. The base unit of claim 12, wherein the resume request includes a cause of the resume request.

14. The base unit of claim 12, wherein the transceiver:
    sends an indicator to the last serving base unit; and
    in response to receiving an acknowledge response from the last serving base unit, sends the configuration message to the remote unit.

15. The base unit of claim 12, wherein the transceiver:
    sends a Retrieve user equipment ("UE") Context Request to the last serving base unit; and
    in response to receiving a UE context of the remote unit from the last serving base unit, sends the configuration message to the remote unit.

16. A remote unit in an inactive state, wherein the remote unit comprises:
    a transceiver that:
       sends a resume request to a current base unit; and
       in response to sending the resume request, receives a configuration message from the current base unit to maintain the remote unit in the inactive state, wherein the current base unit, in response to receiving the resume request, sends a message to a last serving base unit and sends the configuration message in response to receiving a response from the last serving base unit.

17. The remote unit of claim 16, wherein the resume request includes a cause of the resume request.

18. The remote unit of claim 17, wherein the cause is a periodic radio access network ("RAN") notification area update.

19. The remote unit of claim 16, wherein the transceiver receives the configuration message by a signal radio bearer.

20. The remote unit of claim 16, wherein the transceiver receives the configuration message by a signal radio bearer.

* * * * *